Patented Nov. 20, 1945

2,389,191

UNITED STATES PATENT OFFICE 2,389,191

SEPARATION PROCESS

J. D. Fitzpatrick and Latimer D. Myers, Cincinnati, Ohio, assignors to Emery Industries, Inc., Cincinnati, Ohio, a corporation of Ohio No Drawing. Application March 5, 1942, Serial No. 433,516

2 Claims. (Cl. 260—406)

This invention relates to a method for isolating the products of oxidation of unsaturated fatty bodies from one another. This application is a continuation in part of Fitzpatrick-Myers United States application Serial No. 385,740, filed March 28, 1941, entitled "Oxidation of unsaturated fatty bodies," and the present method is disclosed primarily in relation to the separation of the products of oxidation obtained in a process of the type therein disclosed. However, it is to be understood that the process of the present invention is applicable to the separation of commingled oxidation products produced by other methods.

In the Fitzpatrick-Myers application it has been disclosed that unsaturated fatty bodies such as oleic acid may be subjected to a destructive oxidation process and that monobasic acids, dibasic acids, and so-called by-product acids result from such treatment. Azelaic acid is a typical dibasic acid; pelargonic is a typical monobasic acid. The exact composition of the by-product acids is not known at the present time and they are, therefore, referred to generally as by-product acids in the remainder of the specification. They are of relatively high molecular weight as compared with the monobasic acid cleavage products; they are of low iodine value, for example, 5 to 10, of liquid consistency, light color, and less volatile than the cleavage oxidation products.

In the preferred oxidation process the unsaturated fatty body to be treated is subjected to a strong and powerful oxidizing agent, for example, a mixture of chromic acid and sulphuric acid and, in this treatment, the principal attack upon the unsaturated body is at the double bonds thereof. The dibasic acid, azelaic, is a very valuable product because of its utility in the manufacture of synthetic resins, plasticizers and a host of other materials. Any monobasic acid such as pelargonic is useful in similar fields, being especially suited as a modifying agent in synthetic resin manufacture. The by-product acid component, a product withstanding the attack of a strong oxidizing substance, is almost completely saturated and wholly stable; for this reason it has value as a plasticizer and as an ingredient in textile oils and like materials where freedom from deterioration is a desirable characteristic. In a typical mixture resulting for example from the oxidation of oleic acid, the azelaic acid, the pelargonic acid and the by-product acids are present in approximately equal quantities; however, the exact percentages will depend upon the chemical nature of the unsaturated body which was subjected to oxidation.

Such products, upon being produced in the commingled state in a process like that shown in the Fitzpatrick-Myers patent application, need be separated and isolated from one another to be of the utmost value and the principal objective of the present invention has been to provide a process for effecting such division in a simple and economical manner. Moreover, since the value of the products of oxidation is influenced appreciably by their purity, it has also been the objective in the invention of this process to recover the various components, each substantially uncontaminated by the others or by foreign substances.

The oxidation products of an unsaturated fatty acid differ chemically from one another but they do not differ appreciably as to specific gravity and, in admixture, are quite homogeneous. Separation of these products is a particularly difficult problem because of their mutual solubilities one for the other. While it has been appreciated that some of the dibasic acids produced, like azelaic acid, are water soluble and that water is therefore susceptible to use as an extracting medium, such large quantities of water are required to dissolve the azelaic acid in the presence of the other components that the cost of separation is prohibitive. The same difficulties are encountered if, instead of using water as an extracting medium for the water soluble component, a solvent such as petroleum ether is used as an extracting medium for the oil soluble components, that is, the pelargonic acid or the by-product acids. We have discovered, however, that if the pelargonic acid be first removed from the products of oxidation in admixture, then the process of separation may be effected easily and economically by the use of an aqueous solvent in which one of the components is soluble but not both. More specifically, we have discovered that only limited quantities of such a solvent are required to effect separation of the azelaic acid from the by-product acids when the pelargonic acid component is absent.

Dibasic acids below $C_9$ are water soluble, but it also is to be observed that the oxidation of some unsaturated fatty bodies leads to the production of dibasic acids which are not water soluble. The present invention is intended particularly to be used when water soluble dibasic acids such as azelaic are to be recovered. Inasmuch as azelaic acid is the principal dibasic acid in the oxidation of a typical fatty body like oleic acid but the presence of other dibasic acids in some instances is known, the term azelaic acid is employed to designate both azelaic acid per se and any other water soluble dibasic acids which may be present. Likewise, pelargonic acid is the chief monobasic acid formed from such an oxidation and the use of this term is intended to designate other monobasic acids which may be formed along with it in minor proportions.

In the preferred practice of the invention hot water is employed as the solvent extracting medium for separating the dibasic acid or acids from by-product acids following removal of the pelargonic acid and any other monobasic acids which may be present.

In more detail, the process is as follows: It is desirable first to treat the commingled bodies produced from an oxidation process such as the one shown in the aforesaid copending patent application so as to remove whatever oxidizing agent may have been entrained therein. For example, if chromic acid is the oxidizing agent, the end product is treated with concentrated sulphuric acid whereby all chromic soaps are decomposed and the chromium removed as chromic sulphate dissolved in the acid layer. It is desirable to carry the oxidation process far enough to reduce the iodine value to as low as conveniently practical, for example, say to 3. When this is done, substantially no unsaturated compounds remain and the products of oxidation can then be subjected to treatment by concentrated sulphuric acid without running the risk of forming fatty sulphonates. The formation of sulphonated products is undesirable because such materials may act as emulsifying agents making the following separation steps much more difficult to perform.

It is desirable to remove as much as possible of the sulphuric acid by washing the mixture with small amounts of water. The use of large quantities of water for washing out the sulphuric acid is to be avoided because the dibasic acids are soluble in the water and some therefore may be lost when the sulphuric acid is removed in this manner. The last traces of mineral acidity are destroyed by neutralizing with a suitable alkali.

Having then a body consisting of dibasic, monobasic and by-product acids in the commingled state substantially free of oxidizing agent or sulphonation products, the low molecular weight monobasic acid and particularly the pelargonic acid is the first to be removed. This is performed preferably by a topping distillation operation. The pelargonic acid is evaporated and the vapors condensed and isolated as the first product, leaving in liquid admixture the azelaic acid and whatever high molecular weight monobasic acids may be present as by-products of the oxidation process.

Upon removal of the pelargonic acid the azelaic acid and commingled by-product acids are washed with hot water a plurality of times. This step causes the azelaic acid to be dissolved in the wash water. The by-product acids are insoluble in the water and this step therefore enables the by-product acids to be separated and recovered by decanting.

While azelaic acid in admixture with by-product acids is soluble selectively when the mixture is washed with water it is also to be observed that an aqueous solution of azelaic acid acts as a solvent for by-product acids if the concentration of azelaic acid in the water solution becomes too high. To avoid contamination from such causes the method of choice is to wash a given batch of the mixture being separated a number of times and controlling the total amount of the water used in such manner that the azelaic acid content of the collected washes will not exceed approximately 10%. The first wash water may contain a percentage of azelaic acid somewhat higher than 10%, the subsequent washes less. Clean, sharp separation is obtained when the concentration of azelaic acid in the collected wash waters does not exceed approximately 10%. Usually the total amount of wash water to be employed for treating a given batch which is being separated is divided in anywhere from three to six parts so that the mixture can be subjected to washing with from three to six batches of fresh wash water. It is to be noted that when the wash waters are collected and permitted to stand, an additional amount of by-product oil separates; this is due to the fact that when the first batch of wash water is added the amount of azelaic acid which dissolves in it exceeds 10% and therefore carries some by-product acid into the first wash water solution. The second and succeeding wash waters will contain amounts of azelaic acid less than 10%. When all wash waters are combined the total concentration of azelaic acid is sufficiently low that the azelaic acid cannot hold by-product acids in the solution. It is desirable to maintain the solution well above the crystallization point of azelaic acid during the settling period.

From this point on two alternative procedures are available for recovering the azelaic acid from the wash water. In the first procedure the azelaic acid is crystallized from the aqueous solution by chilling it to a point below the temperature of crystallization. In the other procedure the water of the aqueous solution is removed by distillation.

The crystallization process is most suited for the production of crystals of azelaic acid of the highest purity but this process is the most expensive. Moreover, in the crystallization process a certain fraction of azelaic acid remains in the mother liquor after crystallization is substantially completed. Because of cost it is requisite that the mother liquor from which azelaic crystals have been removed be used as wash water for the next successive batch. Such wash water, having a certain quota of azelaic acid already contained in it, has less solvent power for azelaic acid than distilled water, and greater quantities of water are required to keep below the 10% maximum. It is also to be noted that any impurities contained in such wash water are recycled.

Paradoxically, moreover, the evaporation step is more economical than the crystallization step. In the crystallization procedure the temperature must be reduced so low that either mechanical refrigeration must be employed or the solution self-refrigerated by vacuum evaporation. Yet the mother liquor must be heated from this low temperature to substantially its boiling point before it can be used as wash water on a next successive batch. The crystals in turn have to be centrifuged to free them as much as possible from mother liquor and then they must be dried and pulverized. In the evaporation step all of the water is driven off and can be condensed free of impurities and ready for use in the separation of a future batch of azelaic acid from the by-product acids. The temperature of the condensate may be sufficiently high to permit the use of the condensate as wash water without further heating.

With these principles in mind either the evaporation step or the crystallization step may be employed depending upon the nature of the products to be recovered and the equipment available. The evaporation method is preferred in the commercial application of the process but both methods are disclosed in detail in the specification which follows and it is to be understood that either step is included as a part hereof.

The crystallization and evaporation methods also may be combined as, for example, subjecting the original wash water solution to a low temperature to obtain pure azelaic acid, then evaporating the mother liquor to recover the acids it contains. The evaporated acids will be predominantly azelaic but some acids of lower molecular weight formed originally in the oxidation process may be present.

Although it is desirable and possible from a theoretical point of view to wash the azelaic acid completely from the by-product acids it has been determined that, because of diminishing returns, it is not usually practical to endeavor to do so inasmuch as such large quantities of wash water are required that the cost of recovering the azelaic acid from the wash water becomes an important item of expense. It is not usually economical to wash out more than 85 to 95% of the azelaic acid content of the mixture, leaving approximately 5 to 15% remaining in admixture with the by-product acids. It has been discovered that this remaining azelaic acid may be removed readily and economically by treating the by-product acids with an amount of alkali controlled so as to effect the saponification of one carboxyl group of the azelaic acid admixture but not both carboxyl groups thereof. The partially saponified dibasic acids then become sufficiently water-soluble that their segregation from the by-product acids can readily be accomplished.

In the treatment of the by-product acids containing the small quantity of azelaic acid, alkali is introduced as aqueous solution. The components are mixed and permitted to stand whereupon the azelaic acid is partially saponified and the aqueous solution containing the partially saponified azelaic acid separates sharply therefrom and may be drawn off. The partially saponified azelaic acid solution in turn is treated with a mineral acid such as sulphuric to de-saponify it and the free azelaic acid content is then preferably removed by crystallization. The mother liquor of this crystallization step is best discarded because of the percentage of mineral acid or inorganic salt which it contains.

To assist those skilled in the art in the practice of the invention examples of typical applications of the process are provided. From the foregoing description of the principles upon which the process is predicated and from the following specific disclosure of its application, those skilled in the art readily will comprehend the modifications to which the process is susceptible. In the foregoing portion of the specification and in the examples which follow oleic acid and its oxidation repeatedly have been referred to inasmuch as oleic acid is the chief unsaturated fatty acid component of naturally occurring fats; and it is to be understood that the disclosure of this particular material is not by way of limitation upon the separation of water-soluble dibasic acids, low molecular weight monobasic acids and high molecular weight by-product acids which result in admixture from the oxidation of other unsaturated compounds.

*Example 1*

Two hundred and twenty-nine pounds of oxidized mixture of low iodine value prepared according to the method disclosed in our aforesaid copending application is treated with 3% by weight of 60° Bé. sulphuric acid with agitation while heating to a temperature of 90° to 100° C. for one-half hour. The mixture is allowed to settle for a few minutes and the separated sulphuric acid solution of chromic sulphate drawn off.

The oxidized mixture having been freed of its green coloration is washed twice with water using 6# of water for each wash and then 1# of caustic soda dissolved in a little water is added.

The above oil mixture with all mineral acidity neutralized is dried and distilled. The fraction obtained by heating up to 410° F. under 1¾ in. absolute pressure amounting to 91# consists of pelargonic acid.

The still residue amounting to 138 lbs. is agitated with 30 gal. of boiling water and allowed to settle. The lower aqueous solution is drawn off. Three additional similar washings are made and the combined aqueous solutions are allowed to settle while hot. Any oil carried by the first washes is separated.

The clear azelaic acid solution is cooled to 70° F. in a crystallizing vessel with agitation. The azelaic acid slurry is then centrifuged to remove most of the water and the wet centrifuge cake dried in a suitable dryer. Approximately 60# of azelaic acid are obtained.

The oily by-product residue remaining amounted to 70#.

*Example 2*

The oxidation products of oleic acid are freed from chromium compounds and are neutralized and distilled as outlined in the previous example.

The still residue is washed with six portions of boiling water, the weight of each wash being equal to the original weight of still residue. The aqueous solutions were withdrawn from the by-product acids layer and combined. The resulting aqueous solution which contained 10% azelaic acid was allowed to settle hot and oily impurities removed.

The azelaic acid solution is then evaporated to dryness. The removal of the last trace of water is indicated by a final temperature of 120° to 130° C.

*Example 3*

By-product fatty acids containing approximately 15% azelaic acid are boiled with water; and caustic soda solution added until the water layer showed a pH of about 8, using rosalic acid as an indicator.

The aqueous solution was removed and acidified with sufficient sulphuric acid to react with the alkali previously added. The small amount of oily impurities which separated on acidification was removed before cooling to crystallize out azelaic acid.

Upon cooling the aqueous solution to 70° F. the azelaic acid separates as crystals which are removed by filtration. A yield of 10% by weight of the by-product acids was obtained. The acid value of the by-product acids remaining indicated practically complete removal of dibasic acids.

This application is directed particularly to the discovery of the improved results which can be obtained by first removing pelargonic acid from the oxidation products in admixture and also to a method in which water is employed as an extracting medium for separating the components from one another following removal of the pelargonic acid.

Having described our invention, we claim:

1. A process of separating commingled azelaic acid, pelargonic acid and by-product acids from one another, which process comprises first removing the pelargonic acid content of the commingled bodies by distillation, adding water to the mixture of azelaic acid and by-product acids thereby forming two layers, one containing a solution of azelaic acid and the other consisting essentially of by-product acids, removing the by-product acids from the aqueous solution of azelaic acid and evaporating the water from the solution of azelaic acid.

2. A method of separating azelaic acid from a mixture of azelaic acid and by-product acids, which method comprises washing the admixture with water to dissolve the azelaic acid thereof, removing the water containing the dissolved azelaic acid from by-product acids, continuing said washing operation until the by-product acids contain no more than from approximately 5% to 15% of azelaic acid, and finally removing the last traces of azelaic acid from the by-product acids by treating the by-product acids with an aqueous solution of alkali so controlled in amount as to effect saponification of one carboxyl group of each molecule of azelaic acid remaining in the by-product acids but not both carboxyl groups thereof.

J. D. FITZPATRICK.
LATIMER D. MYERS.